UNITED STATES PATENT OFFICE.

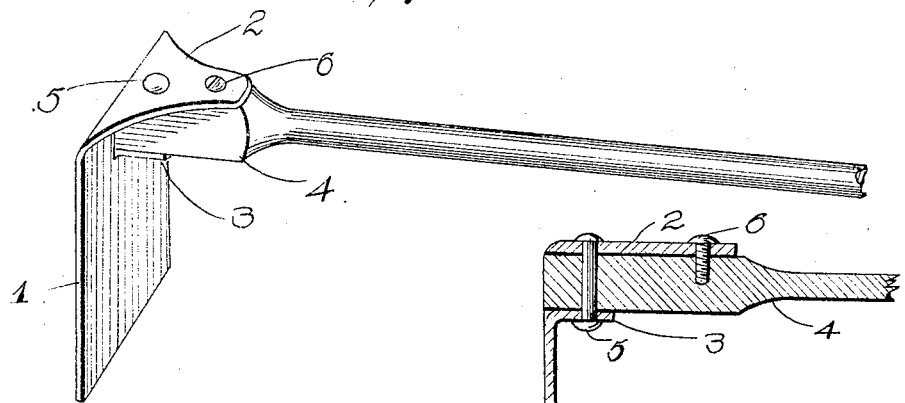
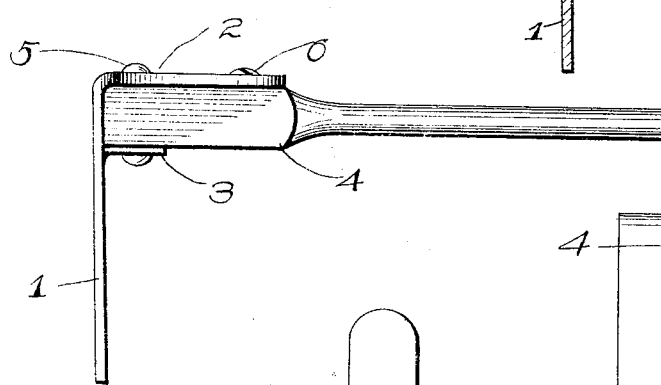
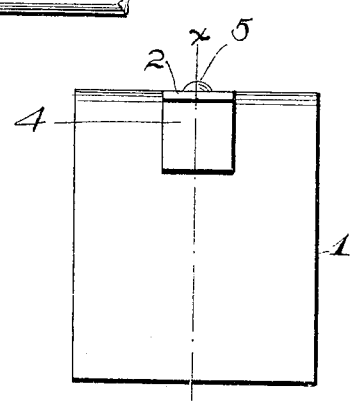
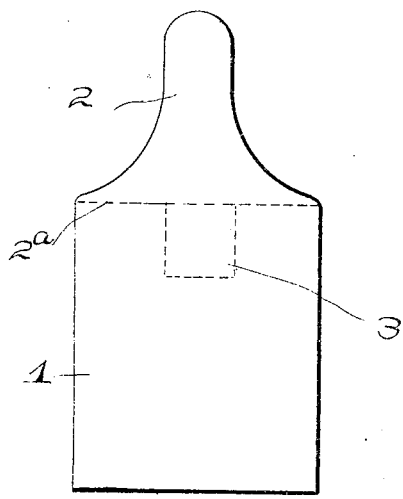

WILLIAM A. SPARKS AND WILLIAM P. KINGSBURY, OF PARKERSBURG, WEST VIRGINIA, ASSIGNORS TO THE KANAWHA IMPLEMENT COMPANY, OF CHARLESTON, WEST VIRGINIA, A CORPORATION OF WEST VIRGINIA.

HOE.

No. 803,447.  Specification of Letters Patent.  Patented Oct. 31, 1905.

Application filed December 17, 1904. Renewed August 8, 1905. Serial No. 273,323.

*To all whom it may concern:*

Be it known that we, WILLIAM A. SPARKS and WILLIAM P. KINGSBURY, citizens of the United States, residing at Parkersburg, in the county of Wood and State of West Virginia, have invented certain new and useful Improvements in Hoes; and we do hereby declare the following to be a full, clear, and exact description of the invention, such as will enable others skilled in the art to which it appertains to make and use the same.

Our invention relates to hoes, more particularly to hoe-blades, and means for attaching them to the handle.

It has for its object to provide a hoe that will be extremely simple of construction and cheap of manufacture which will be at the same time strong and durable.

The invention consists in forming the hoe-blade from a single flat piece of metal by bending the upper edge down upon the upper side of the handle and cutting a lip from the plate, leaving an opening adapted to exactly fit the end of the handle, said lip bent to engage the under side of said handle.

In the accompanying drawings, illustrating the preferred embodiment of our invention, Figure 1 is a perspective view of a hoe made in accordance with our invention. Fig. 2 is a side view with part of the handle broken away. Fig. 3 is an end view; and Fig. 4 is a view of the blank piece of metal from which the blade is made, the lines upon which the lip is cut and said lip and the upper portion is bent being shown in dotted lines. Fig. 5 is a detailed sectional view on the line $x\,x$ of Fig. 3.

While the preferred embodiment of our invention is fully shown in the accompanying drawings and its construction and operation is clearly described in this specification, the right is reserved to make such changes from the construction shown and described herein as the scope of the claims hereunto appended will permit.

Referring more particularly to the drawings, in carrying out our invention we provide the blade from a flat piece or sheet of metal 1 by bending the upper portion 2 on the line $2^a$ and cutting a lip 3 of such size and shape that the opening will fit close around the end of the handle 4. The upper cut is on the line of the bend of the upper portion of the plate, and the lip 3 is bent inward to fit along the under side of the end of the handle. Said lip and the upper bent portion 2 are suitably secured to the opposite surfaces of the handle, as by a rivet-bolt 5, extending entirely through the handle and securing both parts thereto, and the bent portion is preferably secured also by an independent bolt or screw 6, which reinforces the joint and prevents turning of the blade upon the handle. The connection is further reinforced by the handle extending into the closely-fitting opening from which the lip is cut.

Having thus described our invention, what we claim as new, and desire to secure by Letters Patent, is—

1. A blade for hoes formed from a single flat piece of metal, having means to secure it to the upper surface of the handle, and a lip cut therefrom adapted to engage the lower side of said handle.

2. A blade for hoes formed from a single flat piece of metal, having means to secure it to the upper surface of the handle, and a lip cut therefrom adapted to engage the lower side of said handle, the edge of the metal, around the opening formed by cutting the lip adapted to fit closely around the end of said handle.

3. A blade for hoes formed from a single flat piece of metal, having its upper portion bent to engage the upper side of the handle, and a lip cut from said metal piece and bent to engage the lower side of said handle.

4. A blade for hoes formed from a single flat piece of metal having its upper portion bent to engage the upper side of the handle and a lip cut from said metal piece and bent to engage the lower side of said handle, the edge of the metal around the opening formed by cutting the lip adapted to fit closely around the end of said handle.

5. A blade for hoes formed from a single flat piece of metal having its upper portion bent over to engage the upper side of the handle and a lip cut from said metal piece and bent to engage the lower side of said handle, the upper slit for said lip arranged in the line of the bend of the upper portion, and the opening, left by cutting the lip, of such size as to receive and fit closely around the end of the handle.

6. A hoe comprising a handle, a blade formed of a single flat piece of metal having its upper portion bent over to engage the upper side of the handle, a lip cut from said blade and bent over to engage the lower side of said handle, the handle extending into and fitting closely, the opening left by cutting said lip and means to secure said lip and upper bent portion to said handle.

In testimony whereof we affix our signatures in presence of two witnesses.

WILLIAM A. SPARKS.
W. P. KINGSBURY.

Witnesses:
CARROLL PICKETT,
J. A. HANNOMOR.